June 8, 1954
H. J. CARLUCCI
2,680,586
PALLET
Filed June 29, 1948
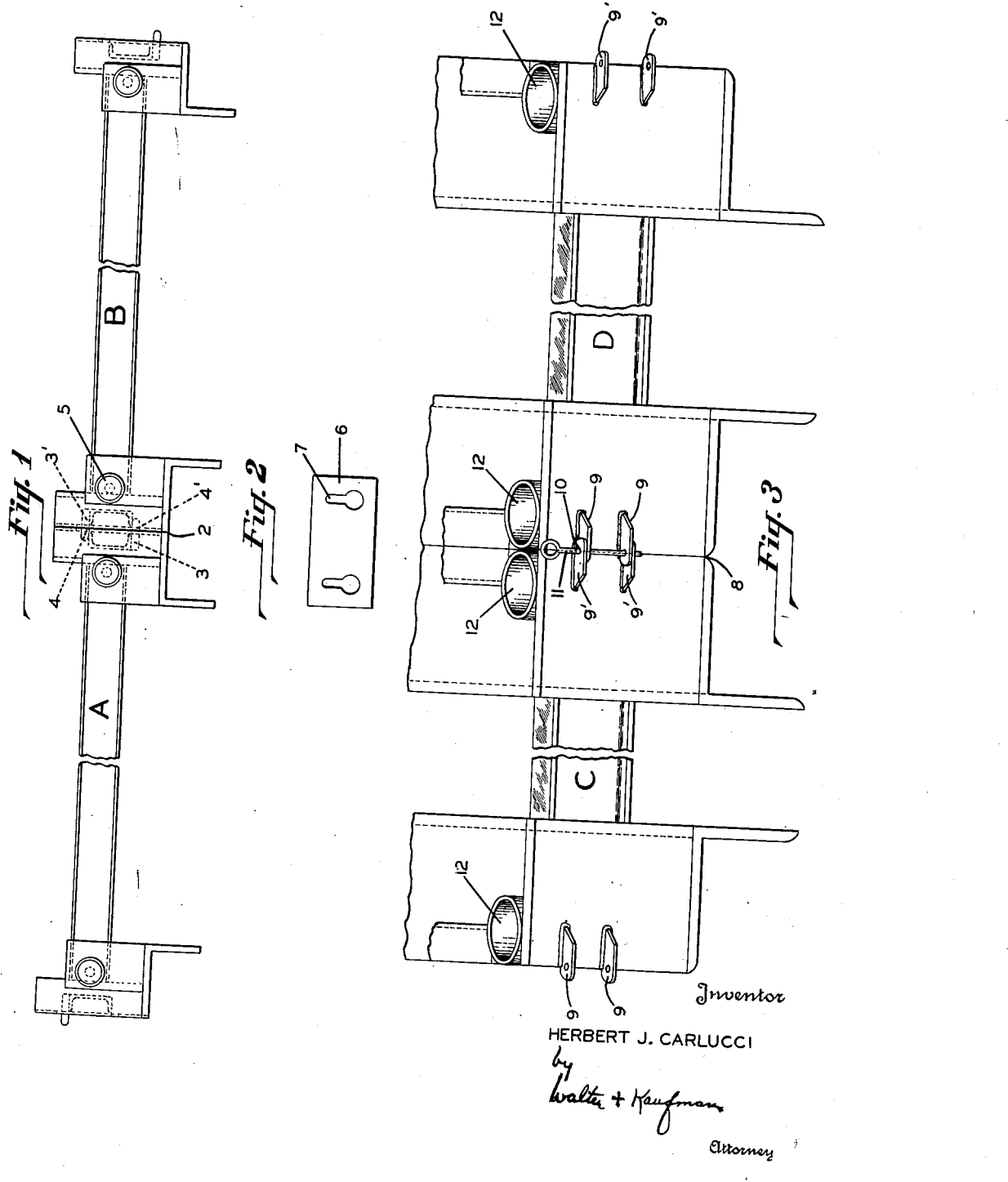
Inventor
HERBERT J. CARLUCCI
by
Walter + Kaufman
Attorney Patented June 8, 1954

2,680,586

UNITED STATES PATENT OFFICE 2,680,586

PALLET

Herbert J. Carlucci, Manheim Township, Lancaster County, Pa., assignor to Armstrong Cork Company, Lancaster, Pa., a corporation of Pennsylvania Application June 29, 1948, Serial No. 35,861

4 Claims. (Cl. 248—120)

This invention relates to a pallet and, more particularly, to a sectional pallet in which the relatively small sections may be fitted together to form a pallet of the size desired to handle quantities of material to be shipped or stored.

In shipping raw materials and partially processed materials, it has been found desirable to have pallets which will fit on trailer trucks and freight cars. In order to accomplish this purpose, I have found a convenient size for a pallet to be approximately 8 ft. wide and 14 ft. long. Two of these pallets can be conveniently placed on the standard 30-foot truck trailer and three of them will fit the standard 45-foot flat car. The height of the pallet is incidental since the pallet forms only the base on which the raw material is placed. However, in cases where loose material is contained in the pallet, it may be found desirable to place sides on the pallets.

In order that the pallets may be stored for further processing of the material, it is oftimes necessary, due to restrictions in the size of warehouse doors and storage facilities in warehouses, to remove the raw material from the pallet. This invention overcomes this difficulty by making it possible to build the large pallets in sections which may be separated and stored individually, thereby allowing the transfer of sections of the pallet rather than removing the material from the pallet. To accomplish this purpose, it has been found desirable to construct the 8 ft. by 14 ft. pallet in three sections approximately 8 ft. by 4 ft. 8 in. In order that the sections may be properly fitted together and locked securely in engagement with one another, I have developed a unique interlocking mechanism which constitutes the subject matter of this invention.

In order that my invention may be more readily understood, it will be described in connection with the attached drawing in which:

Figure I shows a front elevational view of two sections of the pallet in engagement with one another;

Figure II shows a locking plate adapted to hold the two sections of Figure I together during shipment; and Figure III is a modification showing another mechanism for holding the pallets of my invention together.

Referring to Figure I, there are shown two pallet sections A and B. These two pallet sections are in abutting relationship with one another at point 2. In order that the pallets may be properly aligned and locked in abutting relationship, there are provided a pin and a pin receiving recess in each corner of the pallet section. In Figure I, it will be noted that the pin 3 is on pallet section A and fits into a pin receiving recess 4' in pallet section B. The pin 3 on section A is at the bottom of the securing mechanism and the pin receiving recess 4' of pallet section B is at the bottom of the securing mechanism of pallet section B. Pin 3' is at the top of pallet section B and the pin receiving recess 4 is at the top of pallet section A. It will be noted that the pin and the pin receiving recess at the opposite ends of sections A and B are the reverse of the structure shown at point 2 of Figure I of the drawing, thus enabling other pallet sections to be joined in a similar manner.

Provided on each section of the pallet, close to the line of juncture, are two knobs 5. After the pallet sections have been placed in abutting relationship with one another with the pins in the pin receiving recesses, locking plate 6 shown in Figure II is placed over the knobs 5 and lowered so that the notches 7 are in engagement with the shanks of the knobs 5 to prevent the plate 6 from being jarred loose. Plate 6 is placed on the structure to prevent the pallets from moving away from one another while the pins in the pin recesses prevent the pallet from moving vertically and laterally. In addition to the knobs 5 being used to hold the locking plate 6, the knobs can also be used to attach a rope or chain sling to the pallet sections to lift them.

On the other side of the pallet, the position of the pin and pin recess in pallet section B, for example, must be opposite from that shown in the juncture point 2 or, in other words, will be exactly the same as that shown at the free end of the pallet section B in the drawing. It will be clear that in a structure of this kind, the pallet sections can be turned end for end and can be butted together and held securely in engagement with one another.

While, in the example set forth above, the preferred size of the sectional pallets is given as 8 ft. by 4 ft. 8 in., it will be understood that any size desired to suit the user's demands can be employed and any number of pallet sections may be fitted together to make a master pallet for shipping purposes.

In Figure III, there is shown a modification of my invention in which two pallet sections C and D are secured in abutting relationship at point 8. In this modification there are provided cleats 9 and 9'. These cleats are welded to the side of the pallet frame and each cleat is provided with a pin receiving hole 10. It will be noted that the cleats welded on section C have sufficient space between them to receive cleats 9, welded on section D. When the pallets are placed together with the cleats 9 between the cleats 9', the pin receiving holes 10 will be in alignment and a pin 11 is placed therethrough to hold the pallet sections in alignment. It will be noted that on the free ends of sectional pallet C, the cleats are placed close so that they will fit between the cleats on the next adjacent pallet and, on the free end of pallet section D, the cleats are spaced wider apart so as to receive the cleats on the adjacent pallet section between them. For ease in following the positioning of the cleats, the cleats placed farthest apart will be designated by the numeral 9' and the cleats placed close together will be designated by the numeral 9. It will be understood that on the opposite side of the pallet sections, the position of the narrow cleats will be reversed, that is, they will be on section C while the wide cleats will be attached to section D. This enables the pallet sections to be fitted together regardless of whether or not they are turned end for end.

In Figure III are shown rack receiving recesses 12. These are merely provided to show that in storing, suitable pipe racks may be placed in the recesses 12 and the pallets stored one on top of the other.

It will be clear from the above disclosure that I have developed a sectional pallet in which a plurality of sections may be securely held together to form a master pallet of any desired size for shipment. This enables large quantities of materials to be shipped and stored with a minimum of handling.

While I have illustrated and described certain preferred embodiments of my invention, it will be understood that the same is not so limited, but may be otherwise practiced within the scope of the following claims.

I claim:

1. A pallet structure comprising a plurality of sections adapted to be arranged in abutting relationship, pins projecting outwardly from said sections, there being corresponding pin receiving recesses formed in the adjacent section so that the pins will fit into the recesses when the sections are in abutting relationship, the arrangement of pins and recesses being such that they will engage one another when the sections are reversed, and locking means adapted to lock the sections together when the pins and recesses are in engagement with one another.

2. A pallet structure comprising a plurality of sections adapted to be arranged in abutting relationship, pins projecting outwardly from the sides of said sections, there being corresponding recesses formed in the adjacent sections so that the pins will fit in the recesses when the sections are in abutting relationship, the arrangement of pins and recesses being such that they will engage one another when the sections are reversed, adjacent sections being provided with lugs over which a locking plate is placed to lock the sections together.

3. A pallet structure comprising a plurality of sections adapted to be arranged in edge-to-edge abutting relationship having their load supporting surfaces on the same plane, interengaging means provided on said sections to cooperate with one another when the sections are arranged in edge-to-edge abutting relationship, the arrangement of the interengaging means on adjacent sections being such as to interengage when the sections are reversed, and locking means to lock the sections together when the interengaging means are in engagement with one another.

4. A pallet structure in accordance with claim 3 in which the interengaging means are cleats secured to the side of the pallet structure.

References Cited in the file of this patent

UNITED STATES PATENTS

| Number | Name | Date |
| --- | --- | --- |
| 1,522,210 | Scroker | Jan. 6, 1925 |
| 1,688,437 | Romine | Oct. 23, 1928 |
| 2,226,042 | Zane | Dec. 24, 1940 |
| 2,330,852 | White | Oct. 5, 1943 |

FOREIGN PATENTS

| Number | Country | Date |
| --- | --- | --- |
| 62,238 | Austria | Nov. 25, 1913 |